Patented Mar. 13, 1928.

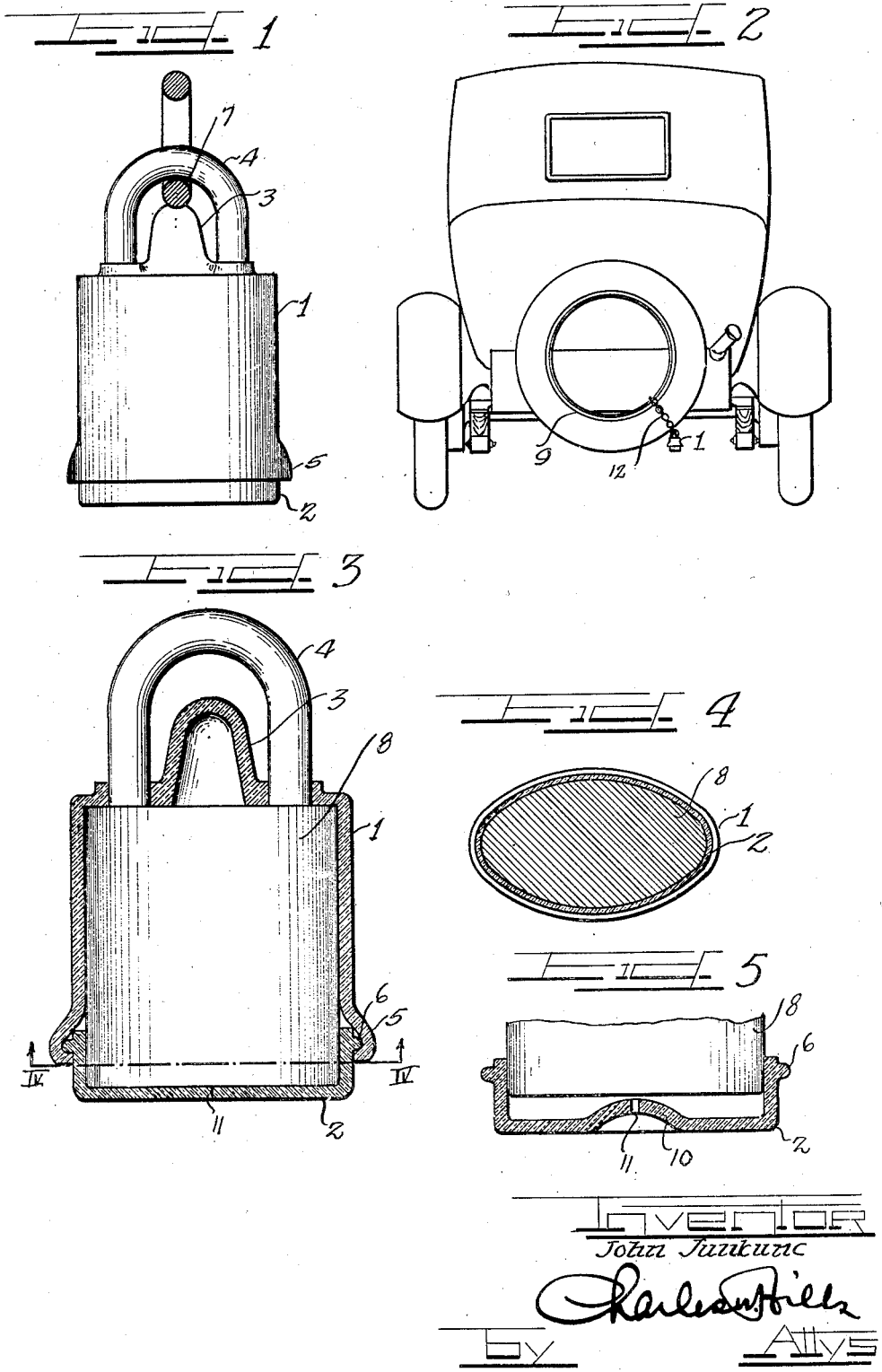

1,662,612

UNITED STATES PATENT OFFICE.

JOHN JUNKUNC, OF CHICAGO, ILLINOIS.

CUSHIONING CASING FOR LOCKS.

Application filed December 17, 1924. Serial No. 756,431.

This invention relates to a cushioning casing for locks for the purpose of preventing noise and wear between a lock and adjacent objects.

It is an object of this invention to provide a casing for locks that will eliminate the rattle between a lock and chain when subject to vibration.

It is a further object of this invention to provide a non-corrosible moisture and dustproof covering for locks.

It is a further object of this invention to provide a covering for locks that will make unnecessary surfacings, coatings or polishes for locks, thereby considerably reducing the cost of the lock itself.

It is a further object of this invention to provide a covering for locks for the prevention of wear of the locks and adjacent objects.

Other and further important objects of this invention will be apparent from the disclosures in the accompanying drawings and the following specifications.

The invention (in a preferred form) is illustrated on the drawings and hereinafter more fully described.

On the drawings:

Figure 1 is an elevational view of a padlock with a cushion casing embodying the principles of this invention in position on it, and a sectional view of one link of a chain in engagement with the padlock.

Figure 2 is a rear view of an automobile showing the invention in use on a chain for a spare tire of an automobile.

Figure 3 is an enlarged view similar to Figure 1 with the cushion casing shown in section.

Figure 4 is a section on the line IV—IV of Figure 3.

Figure 5 is a section similar to that of Figure 3 of the lower portion of the cushion casing, in the process of being slipped on the lock.

As shown on the drawings:

The reference numeral 1 indicates the upper portion and 2 the lower portion of a cushion casing, which may be made of any suitable material but which is preferably formed of rubber or rubber composition.

The casing 1 has a hollow raised portion 3, conforming roughly with the curve of the shackle 4, and a curved ridge 6 of the lower portion 2. A chain link 7 is shown in Figure 1 in position between the shackle 4 and the casing cushion 3.

The padlock 8 may be of any design, but is shown here as having a slidable shackle 4, which is opened out when putting the casing 1 on or taking it off. The lower casing 2 may be slipped in place by stretching the edge 5 over the ridge 6. The elasticity of the material will be sufficient to hold it in place. The lower casing 2 has a cupped portion 10 with a slot 11 for insertion of the key. When the lower portion of the casing is in position, as in Figure 3, the compression of the cupped portion effectively closes the slot 11, but the elasticity of the material is such as to permit the insertion of a key.

The casing of this invention may be conveniently used for padlocks which are employed to lock spare tires on automobiles. In this use a chain 12 is ordinarily passed around a fixed portion of the automobile body and around a tire 9, the ends of said chain being secured together by the padlock. The casing affords a protection for the padlock from the weather and dust and by its cushioning effect prevents injury to the padlock and adjacent surfaces. The raised portion of the casing under the shackle keeps the padlock from rattling around on the chain by virtue of the resilient pressure of the cushion holding the chain link tight against the shackle.

I am aware that numerous details of construction may be varied through a wide range without departing from the principles of this invention, and I therefore do not purpose limiting the patent granted, otherwise than necessitated by the prior art.

I claim as my invention:

1. A cover for a padlock comprising a cushioning casing, through which the shackle of the lock protrudes, an extension on the casing adjacent the lock, a removable lower portion and a means for securing said portion on the lock.

2. A cover for a padlock comprising a resilient casing, a removable upper portion through which the shackle of the lock protrudes, a removable lower portion covering the key hole and having a ridge for engaging tightly the lower edge of the upper portion.

3. A cover for a lock comprising a cushioning casing in two parts, means for removably securing them over the lock, and means for the insertion of a key when the casing is in place.

In testimony whereof I have hereunto subscribed my name.

JOHN JUNKUNC.